(12) United States Patent  
Maestas et al.

(10) Patent No.: US 9,315,152 B1
(45) Date of Patent: Apr. 19, 2016

(54) VEHICLE SECURITY SYSTEM AND METHOD

(71) Applicants: Tom Maestas, Albuquerque, NM (US); Samantha Rhae Maestas, Albuquerque, NM (US)

(72) Inventors: Tom Maestas, Albuquerque, NM (US); Samantha Rhae Maestas, Albuquerque, NM (US)

( * ) Notice: Subject to any disclaimer, the term of this patent is extended or adjusted under 35 U.S.C. 154(b) by 0 days.

(21) Appl. No.: 14/809,450

(22) Filed: Jul. 27, 2015

(51) Int. Cl.
- *B60R 25/00* (2013.01)
- *B60R 1/00* (2006.01)
- *G01S 19/13* (2010.01)

(52) U.S. Cl.
CPC . *B60R 1/00* (2013.01); *G01S 19/13* (2013.01); *B60R 2300/8073* (2013.01)

(58) Field of Classification Search
None
See application file for complete search history.

(56) References Cited

U.S. PATENT DOCUMENTS

| | | | |
|---|---|---|---|
| 5,012,335 A | 4/1991 | Cohodar | |
| 5,677,979 A | 10/1997 | Squicciarini et al. | |
| 5,815,093 A | 9/1998 | Kikinis | |
| 7,308,341 B2* | 12/2007 | Schofield | B60R 1/12 701/1 |
| 7,940,305 B2 | 5/2011 | Adameck | |
| 8,228,364 B2 | 7/2012 | Cilia | |
| 8,350,907 B1* | 1/2013 | Blanco | H04N 21/4335 348/143 |
| 8,446,469 B2 | 5/2013 | Blanco et al. | |
| 8,494,447 B2* | 7/2013 | Oesterling | H04B 1/3822 455/41.2 |
| 8,520,069 B2 | 8/2013 | Haler | |
| 8,543,289 B2* | 9/2013 | Owens | B60K 35/00 455/343.2 |
| 8,558,678 B2* | 10/2013 | Van Wiemeersch | B60R 25/00 340/426.1 |
| 8,558,690 B2* | 10/2013 | Kleve | H04M 11/04 340/425.5 |
| 8,571,752 B2* | 10/2013 | Videtich | B60R 1/12 455/558 |
| 8,604,937 B2* | 12/2013 | Owens | B60R 16/03 340/438 |
| 8,614,622 B2* | 12/2013 | Van Wiemeersch | B60R 25/04 340/5.54 |
| 8,781,292 B1 | 7/2014 | Ross et al. | |
| 2003/0016130 A1* | 1/2003 | Joao | B60R 25/102 340/539.1 |
| 2003/0117728 A1* | 6/2003 | Hutzel | B60Q 3/023 359/838 |
| 2004/0146272 A1 | 7/2004 | Kessel et al. | |
| 2004/0150717 A1 | 8/2004 | Page et al. | |

* cited by examiner

*Primary Examiner* — Jonathan M Dager
(74) *Attorney, Agent, or Firm* — Dale J. Ream

(57) ABSTRACT

A security system and method for monitoring the inside a vehicle includes a cabin module positioned inside the vehicle having a camera to record video and a microphone to record audio therein. A GPS is in data communication with the cabin processor and configured to generate real time global position data. A cabin transmitter is configured to transmit collected video, audio, and GPS data. A remote monitoring module is displaced from the cabin module and includes a remote receiver and display so that authorities can review the data transmitted from the cabin module. The remote monitoring module can transmit security action instructions back to the cabin module that can control aspects of the vehicle, sound alarms, and emit sound. A trunk module is configured to collect video, audio, and carbon dioxide data from the vehicle trunk so as to monitor if a person has been placed in the trunk.

20 Claims, 12 Drawing Sheets

VEHICLE SECURITY SYSTEM AND METHOD

BACKGROUND OF THE INVENTION

This invention relates generally to vehicle security systems and, more particularly, to a real time vehicle security system for monitoring the security inside and proximate a vehicle and notifying public or private safety authorities of the real time status of the vehicle.

Incidents between police officers and drivers of vehicles involved in traffic stops sometimes result in conflicts that are difficult to piece together after the fact. In other words, if there is some question about whether either the police officer or the driver acted inappropriately, aggressively, or threateningly is often a matter of "he said, she said" and cannot be effectively determined. For example, an officer may later be accused of wrongfully demanding to search a vehicle or even to search the body of a driver without probable cause. In other tragic cases, a person may impersonate a law enforcement officer and wrongfully cause a driver to pull over and commit a criminal act. Still further, carjacking is when an assailant actually removes a driver from his car and then steals it. Unfortunately, there are incidents where criminal acts result in a person being placed in the trunk of a car and the car is driven away, resulting in harm or death to the victim in the trunk.

Therefore, it would be desirable to have a vehicle security system for monitoring the security inside and proximate a vehicle and notifying public or private safety authorities of the real time status of the vehicle. Further, it would be desirable to have a vehicle security system having a cabin module that includes one or more cameras, microphones, a carbon monoxide sensor, and a GPS module for collecting useful data to be transmitted to a remote monitoring module for review and to respond with security action instructions. In addition, it would be desirable to have a vehicle security system having a trunk module having one or more cameras, microphones, and sensors inside the trunk area of a vehicle to determine if a person is in the trunk area.

SUMMARY OF THE INVENTION

The present invention is a global positioning security system. This system will allow its owner to make and save video and audio recordings simultaneously as they take place in real time, and document the date, time, and global position. The system may also offer monthly services as well as "as needed" services. Recordings can take place from multiple view and vantage points from within the owners' vehicle or from one viewpoint depending on system selection. A central monitor will be utilized as well with the system. The system will record and immediately transmit encounters for immediate storage for future reference. The system may announce "Be advised, encounter is currently linked to Global Justice." Owners will be offered an option for immediate uplink for "on duty" legal counsel to witness encounters and, if lawful, advise the owner during encounters.

The system would have multiple cameras and microphones with the ability to activate the system either by voice (In the event law enforcement orders owners' hands to be placed on steering wheel, outside of vehicle, in the air, on the head, or anywhere else) or it can be activated manually if possible. The system may have voice commands with the ability to maneuver cameras by voice (if manually unable to maneuver cameras) for optimal video recordings, and ability to save frames of badge ID and face of law enforcement officer, or other person. The system may have a transmitter and a receiver in the event legal counsel is requested. Legal counsel will have access to audio and video as well as GPS location. Legal counsel will be available to provide affidavit for future use in legal proceedings.

Additionally, if lawful Global Justice will also keep record of officers' performance and rate officers regarding captured stops with Global Justice customers e.g. officer is professional and calm, aggressive, officer verbally abusive etc.. Encounters are primarily meant to maintain peace, and mutual respect, and protection between the owner of the system and law enforcement officials, as well as the owner of the system and other individuals, but not limited to, the aforementioned encounters. The system will document encounters or points of contacts and their respective date, time, and global positions.

Additionally, Global Justice will have a trunk activating system that will alert Global Justice for police assistance in the event of a high-jacking/kidnapping event. The trunk of the vehicle will have a video camera, light, speaker, and microphone. System will activate with sounds of distress (crying, moaning, cries for help etc.). Global justice will provide GPS location of vehicle of customer in distress for easier tracking for Police assistance. A distress light will turn on to alert other drivers as well.

Regarding marketing, a monthly service fee will be charged to maintain an active Global Justice service for the system. Owners will have options to purchase different service plans. Service plans will vary depending on service packages chosen. Owners will also have an option to pay for a video copy which will be immediately ready to send to attorney or representative of choice for future reference as well. Owner will have an option to pay for video to be saved for duration of statute of limitations according to US, state, or territory if they choose to opt out of immediately receiving video for a fee. Different packages may arise with change.

The system is intended to maintain a professional and neutral encounter by documenting as much detail as possible of each encounter. The system may be used as evidence in legal proceedings. The system can also be utilized as a tracking device as well, either on a vehicle or on a person as Global Justice expands products. An App option for cellular or other electronic device usage may be offered for an additional fee for Global Justice services and usage. This app is intended for a personal use that is away from the main vehicle Global Justice System or as a cheaper option versus the vehicle option. As technology advances, the system can be utilized on a person with other objects such as, but not limited to, watches, bracelets, rings, wardrobe and other personal wear, stationary etc. The system will allow for warning such as "Be advised Global Justice is activated. Please step away from the vehicle" when vehicle is unattended. Alerts may be sent to electronic devices of choice such as cellular phone, iPad, email, etc., or a combination.

Cameras will operate both, in all lighting situations and weather conditions. The system will have a tracking device for events when the owner is ordered out of the vehicle. The tracking system will follow owner for thorough documentation of stop and entire incident. The system will also send an automatic feed to a person of choice such as a loved one. This option is intended to inform loved ones or need to know persons that there is an incident taking place, documenting, time, date, global position etc. for follow up. The system may offer 911 options for medical and other emergencies as well. System will utilize Vehicular Identification Number (VIN). As future laws allow, system will have links to law enforcement agencies in order to confirm office and badge identification. Initially, identification may be confirmed utilizing Global Justice legal counsel.

Now with regard to the structure and function of the system, a real time vehicle security system for monitoring the security inside and proximate a vehicle having a vehicle computer, a trunk, and a trunk lid, includes a cabin monitoring assembly having a cabin memory and a cabin processor in data communication with the cabin memory. The cabin module is positioned inside the vehicle cabin and includes a cabin camera configured to selectively record video in the cabin of the vehicle and a cabin microphone configured to selectively record audio in the cabin of the vehicle. A GPS device is in data communication with the cabin processor and configured to generate real time global position data corresponding to the video and audio data. A cabin transmitter is configured to transmit collected real time video, audio, and GPS data so as to alert the authorities or other designated third parties.

A remote monitoring module is displaced from the cabin module and includes a remote receiver and display so that law and security authorities can review the real time data transmitted from the cabin module. The remote monitoring module can transmit security action data back to the cabin module that can control aspects of the vehicle (such as to kill the engine or unlock doors), sound alarms, and emit sound. Further, legal authorities can offer advice to the vehicle driver and to a law enforcement officer at the scene. A trunk monitoring module is configured to collect video, audio, and carbon dioxide data from the vehicle trunk so as to monitor if a person has been placed into the trunk. The security action data can even open the trunk lid and prevent it from being closed.

Therefore, a general object of this invention is to provide a real time vehicle security system for monitoring the security inside and proximate to a vehicle having a vehicle computer, a trunk, and a trunk lid.

Another object of this invention is to provide a real time vehicle security system, as aforesaid, having a cabin module that includes a camera, microphone, GPS device, and carbon monoxide sensor such that an accurate record can be obtained in real time regarding the security inside the vehicle.

Still another object of this invention is to provide a real time vehicle security system, as aforesaid, that transmits the collected data inside the vehicle to a remote monitoring module, such as a public or private security firm where the vehicle status is reviewed in real time.

Yet another object of this invention is to provide a real time vehicle security system, as aforesaid, in which the remote monitoring module can send security action instructions back to the cabin module that can operate vehicle controls, activate alarms, or issue audible advice and warnings.

A further object of this invention is to provide a real time vehicle security system, as aforesaid, in which a trunk monitoring module is positioned inside the vehicle's trunk and includes a camera, light, carbon dioxide sensor, and microphone for collecting real time security status information for transmission to the remote monitoring module.

A still further object of this invention is to provide a real time vehicle security system, as aforesaid, which can prevent the trunk lid from being closed in case a person has been forced into the trunk, can de-energize the vehicle motor, can lower windows if carbon monoxide levels in the vehicle cabin are elevated, and operate other vehicle controls.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on an enlarged scale of a base of a cabin module taken from FIG. 1a;

FIG. 2a is a perspective view of a wristband with a tracking pendant taken from FIG. 1a;

FIG. 3b is an isolated view on an enlarged scale taken from FIG. 3a;

FIG. 4c is a fragmentary view of the trunk lid locking assembly as in FIG. 4a;

FIG. 6 is a block diagram of the electronic components of the trunk module as in FIG. 3a;

DESCRIPTION OF THE PREFERRED EMBODIMENT

Figure 1A:
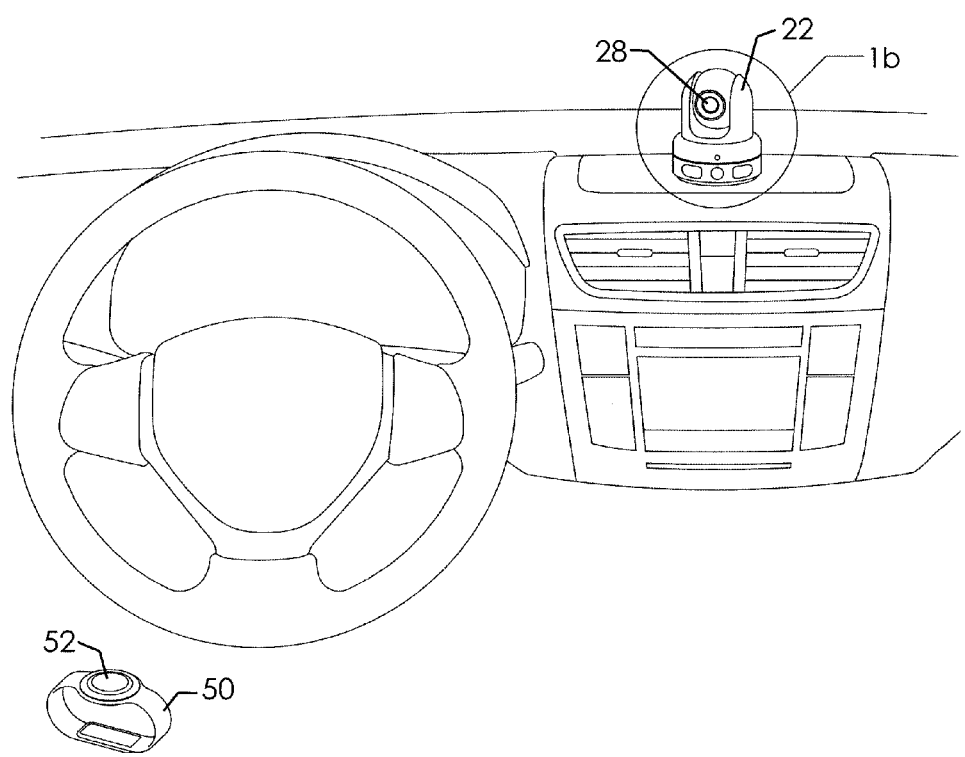
FIG. 1a is a perspective view of a cabin module of a vehicle security system according to a preferred embodiment of the present invention.
Figure 1B:
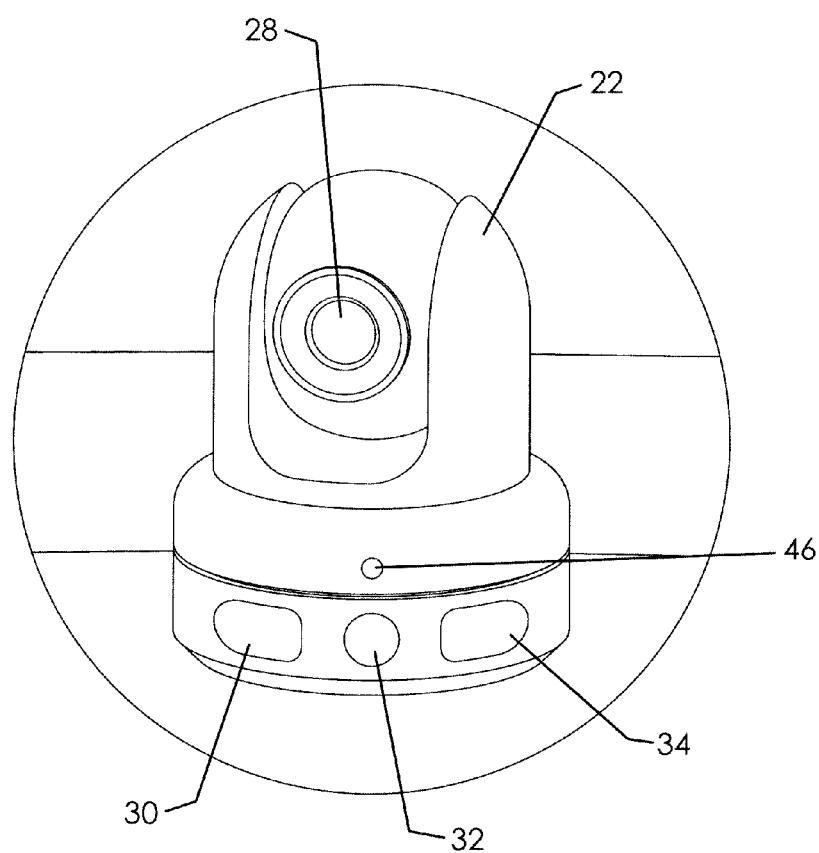
Figure 2A:
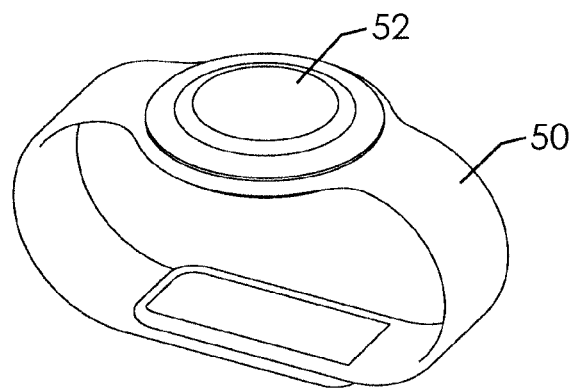
Figure 2B:
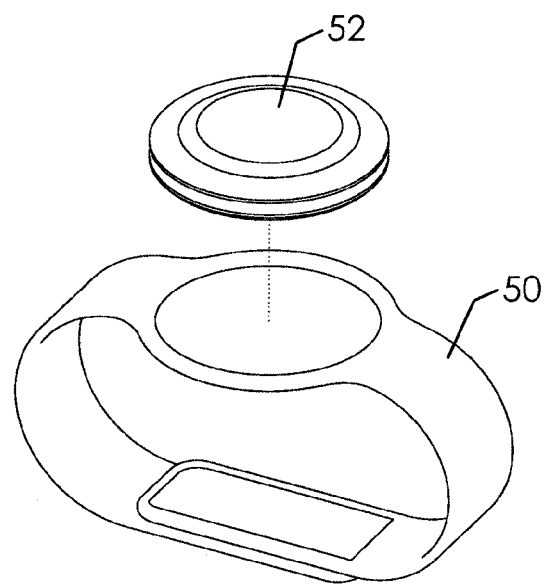
FIG. 2b is an exploded view of the tracking pendant of FIG. 1b.
Figure 3A:
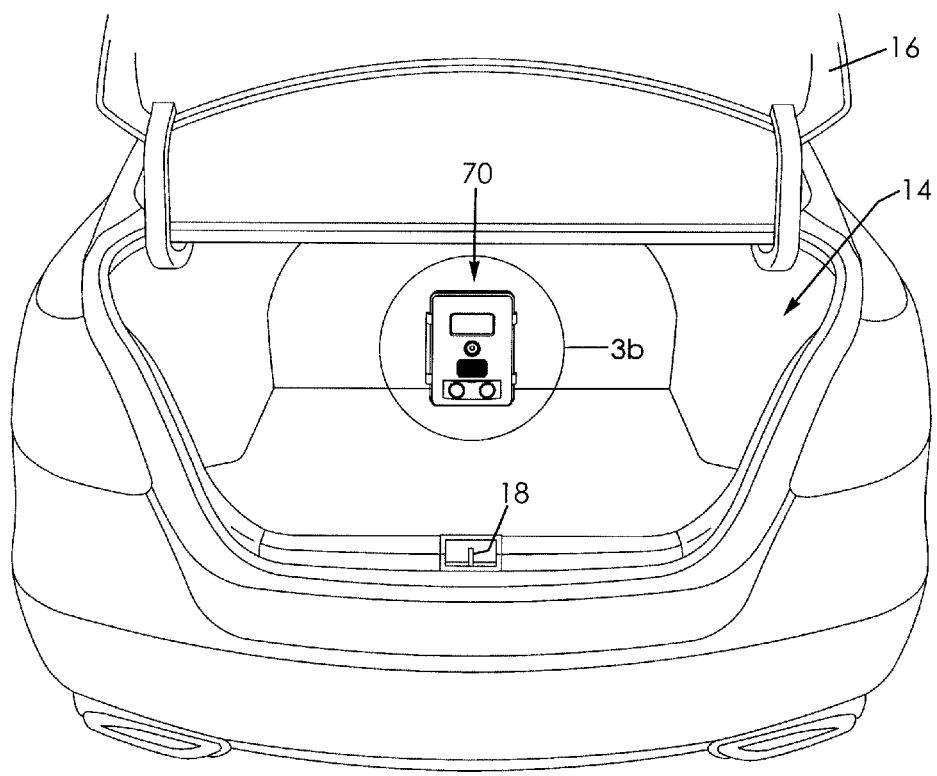
FIG. 3a is a perspective view of a trunk module according to the present invention.
Figure 3B:
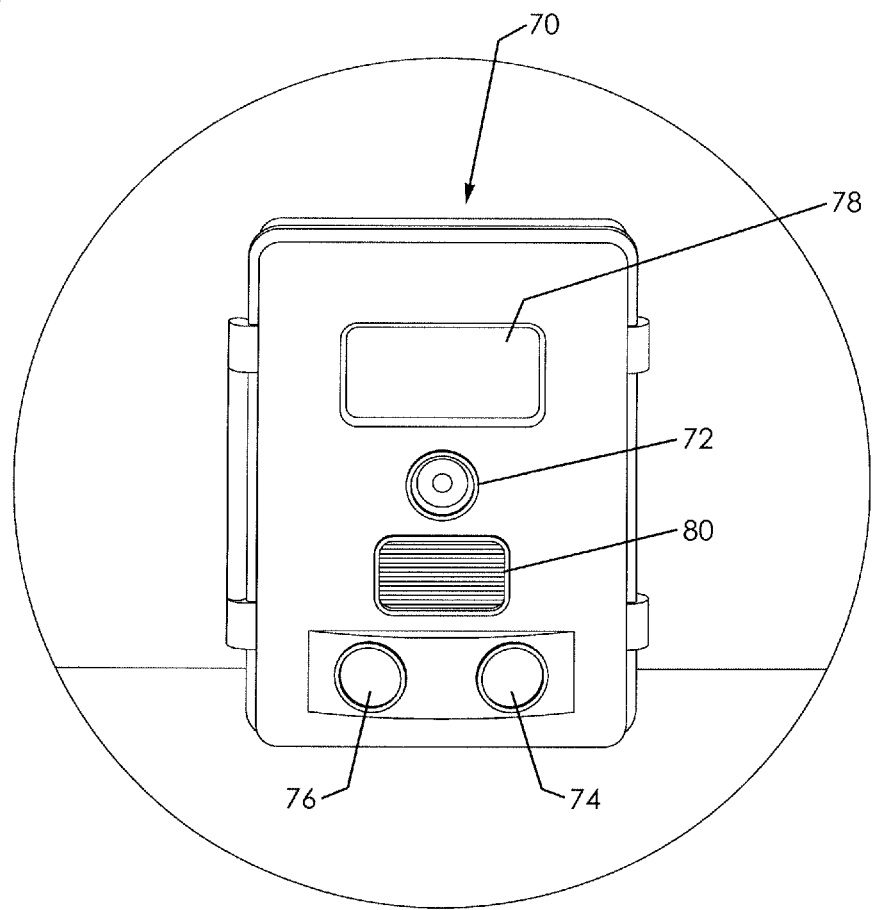

A real time vehicle security system and method for monitoring the security inside and proximate a vehicle according to a preferred embodiment of the present invention will now be described in detail with reference to FIGS. 1a to 11 of the accompanying drawings. The real time vehicle security system 10 includes a cabin monitoring assembly having a cabin module 20, a remote monitoring module 60, a trunk module 70, and a variety of cameras and sensors for monitoring a security status of an automobile in real time and to take actions to address undesirable or unsafe conditions.

The vehicle security system 10 is designed for use with automobiles of all types and, specifically, to vehicles having an interior area or "cabin" where a driver and passengers are seated and having a trunk area 14 accessible by operation of a trunk lid 16. The cabin module 20 includes a cabin memory (not shown) configured to store data and programming instructions and includes a cabin processor 26 in data communication with the cabin memory. The cabin processor 26 is configured to execute programming instructions stored in memory, such as to direct various sensors to collect data and to transmit that data, as will be described later.

The cabin module 20 may include a base 22 that is attachable to a dashboard of a vehicle. In an embodiment, the cabin module 20 may include a plurality of individual units each having a base 22 mounted in spaced apart positions within the cabin of the vehicle. The cabin module 20 includes at least one cabin camera 28 mounted to the base 22 and that is operable to record video data, either for storage, later playback, or to be streamed in real time to a remote monitoring module 60 as will be described in more detail later. The base 22 may include a rotatable structure so as to be rotated by a user, either manually (by hand) or with electronic controls (in the nature of cruise control buttons), motors, and even via voice recognition software control. In other words, the cabin camera 28 may be directed to record video data at a desired location, such as at the window of the driver's door of the vehicle. The cabin module 20 may also include a cabin microphone 32 configured to collect audio input from inside the cabin area. The cabin microphone 32 may be positioned on the base 22 such that video and audio data may be collected simultaneously when activated. The cabin camera 28 and cabin microphone 32 are in data communication with the cabin processor 26 such that the cabin processor 26, when executing respective programming instructions, selectively causes the collection of video and audio data from inside the vehicle cabin. In an embodiment, the cabin module 20 may include a display monitor (not shown) configured to display whatever the cabin camera 28 is recording so that the driver can confirm that it is accurately aimed or directed.

In addition, the cabin module 20 may include a global position system (GPS) module 36 situated in the base 22 and in data communication with the cabin processor 26. Under programming control, the cabin processor 26 selectively energizes the collection of GPS data and may, in some embodiments, associates corresponding GPS data with real time video and audio data. The collected video, audio, and GPS data may at first be stored in the memory but may then be transmitted to predetermined security authorities.

In an embodiment, the cabin module 20 may include a cabin carbon monoxide sensor 34 positioned on or inside the base 22 or at a location displaced from the base 22. In either case, the cabin carbon monoxide sensor 34 is configured to determine a level of carbon monoxide in the ambient area proximate the cabin carbon monoxide sensor 34 and is in data communication with the cabin processor 26. Regular readings taken by the cabin carbon monoxide sensor 34 may be stored in the memory for later review or transmission to the remote monitoring module 60.

In an embodiment, the cabin module 20 may also include a "motor-kill circuit" 38 or equivalent programming step. It is understood that the cabin module 20 and, specifically, the cabin processor 26, is electrically connected to the vehicle computer (not shown) that operates much of the operation of the vehicle. Therefore, when actuated, the motor-kill circuit 38 is configured to instruct the vehicle computer to deactivate the vehicle's engine. In use, such actuation of the motor-kill circuit 38 may come by receiving a respective security action instruction from the remote monitoring module 60 as will be described later.

The cabin module 20 includes a cabin transmitter 42 and a cabin receiver 44 configured to transmit or receive data, respectively. The cabin transmitter 42 and cabin receiver 44 are in data communication with the cabin processor 26. In an embodiment, data corresponding to the status of the security situation within the cabin of the vehicle and the area proximate the vehicle may be transmitted via electromagnetic signals although other signal transmission forms would also work. The transmitted signals may be encrypted for added security. For instance, when the cabin module 20 has been activated—meaning that video data from the at least one cabin camera 28, audio data from the at least one cabin microphone 32, GPS data from the GPS module 36, and carbon monoxide data from the cabin carbon monoxide sensor 34 has been collected, the collected data may be transmitted via the cabin transmitter 42. The transmission function would be controlled by the cabin processor 26 under programming control. It is understood that the cabin module 20 may include a plurality of cabin cameras, cabin microphones, and other sensors such that the video data is more complete or even panoramic.

In use, a driver of the vehicle may have control over when the system 10 is activated. For instance, the vehicle security system 10 may be inactive until proactively activated. To do so, the driver of the vehicle may press an on/off button 46 or initiation may be voice activated. The driver may choose to activate the system 10 when prompted by the light of a police car to pull over or is approached by an officer or unknown person while sitting (but not driving) in his vehicle.

Figure 5:
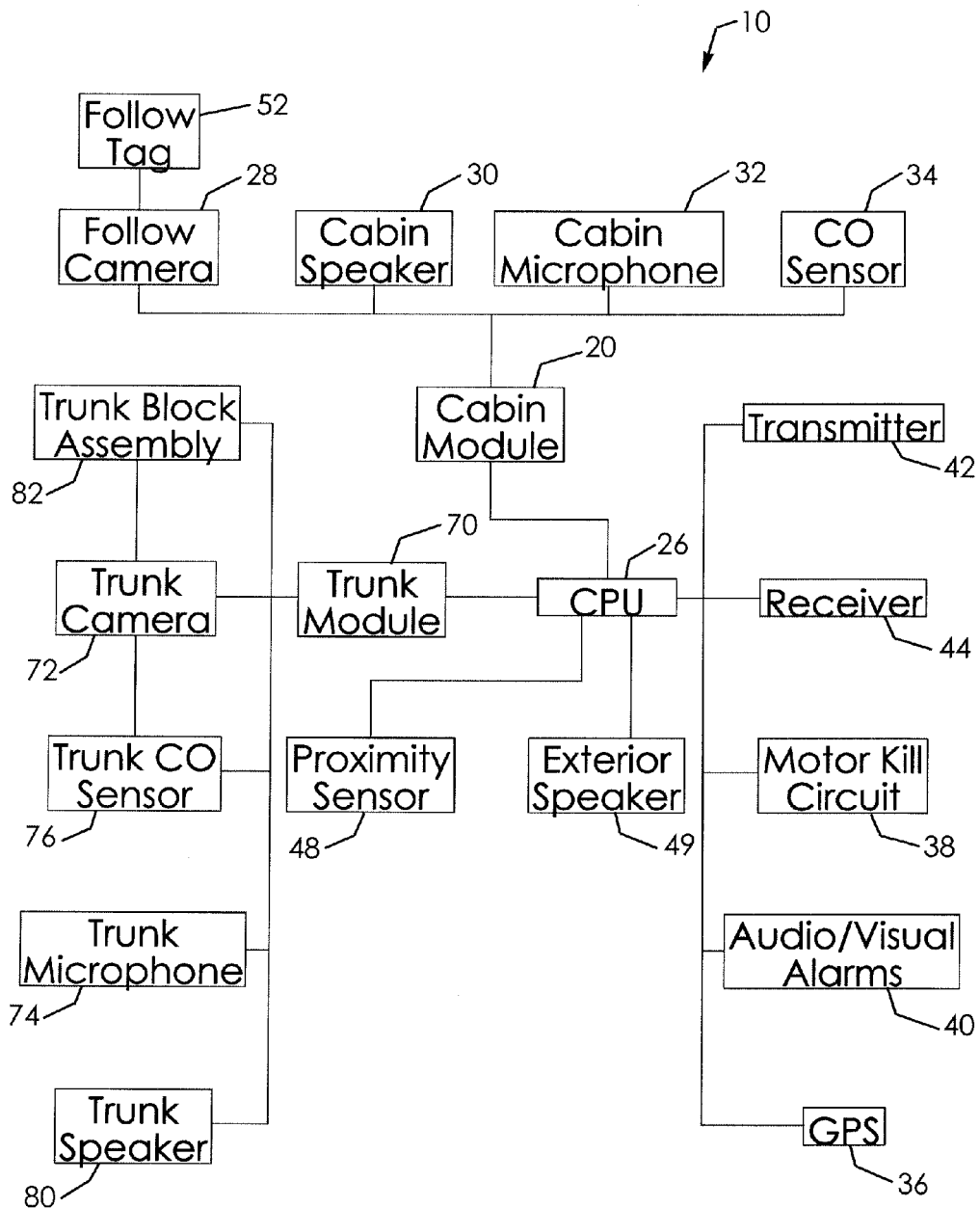
FIG. 5 is a block diagram illustrating the electronic components of the vehicle security system according to the present invention.
Figure 6:
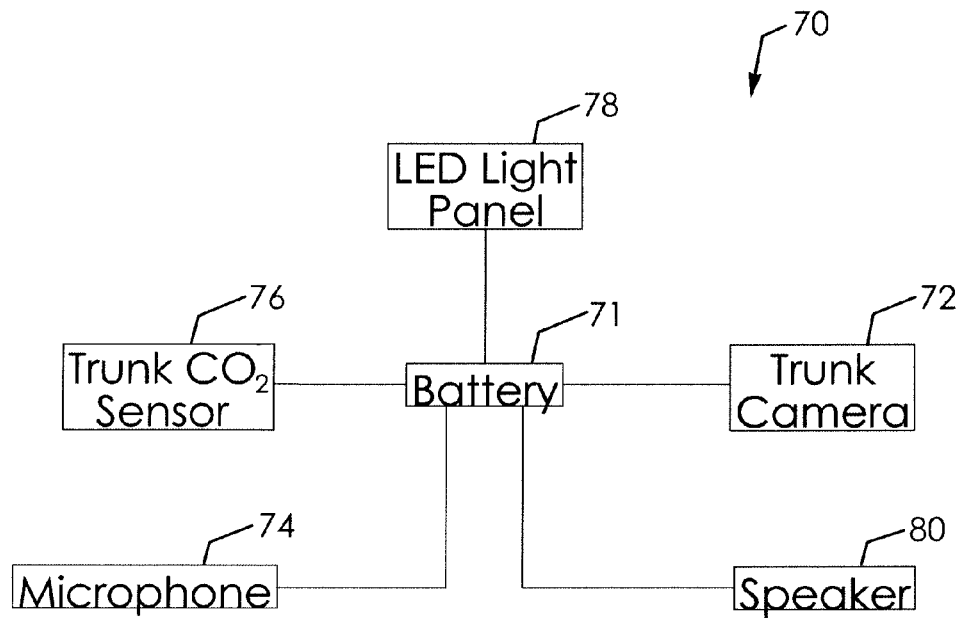
Figure 7:
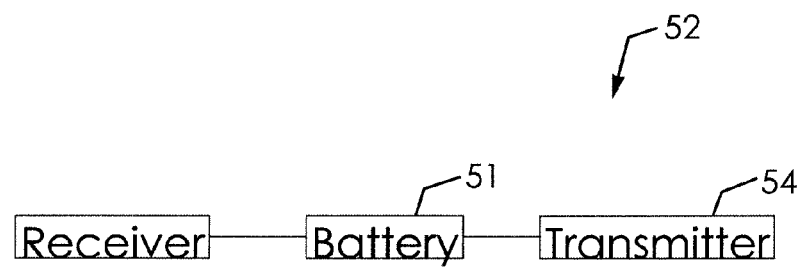
FIG. 7 is a block diagram of the electronic components of a tracking pendant according to the present invention.
Figure 8:
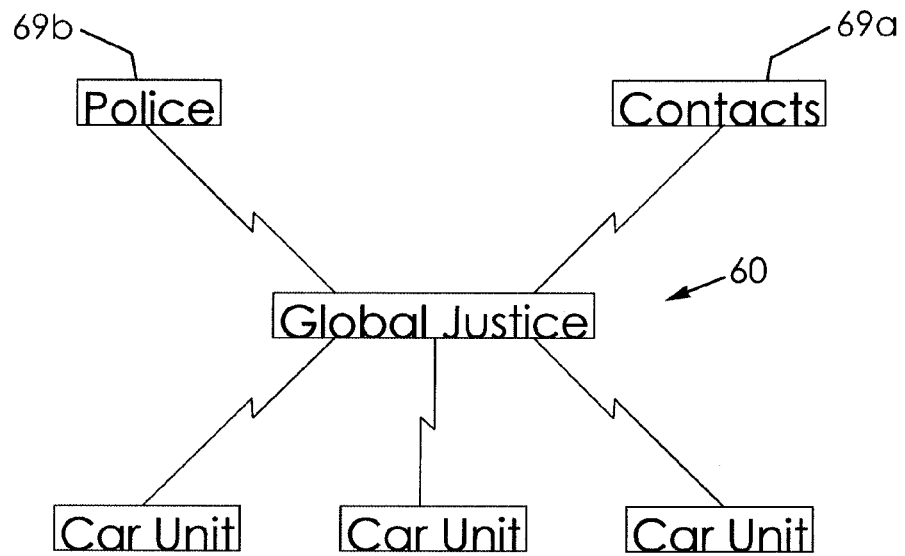
FIG. 8 is a schematic view of the vehicle security system according to the present invention.
Figure 9:
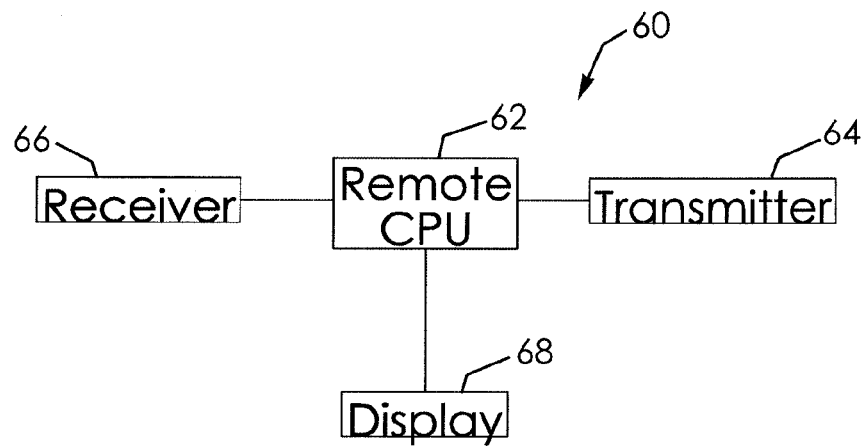
FIG. 9 is a block diagram of the electronic components of a remote monitoring module according to the present invention.

In an embodiment, the cabin processor 26 may be in data communication with electronic devices outside of the cabin. For instance, a proximity sensor 48 may be positioned on the exterior surface or frame of the vehicle and be in data communication with the cabin processor 26 (FIG. 5). Similarly, an exterior speaker 49 may be positioned on an outer surface or frame of the vehicle and be in data communication with the cabin processor 26. The proximity sensor 48 is configured to detect motion proximate to the vehicle and to communicate that activity to the cabin processor 26. In response, the processor 26 may automatically actuate the exterior speaker 49 to state "Be advised, Global Justice is activated" or a similar warning. In this manner, the vehicle security system 10 seeks to maintain security by announcing that it is "watching."

In an embodiment, the cabin camera 28 may be configured to "follow" the driver, such as if the driver steps out or is forced out of the vehicle cabin. For example, if a driver is asked by a police officer to step out of the car, the cabin camera 28, also referred to as a "follow camera," will automatically rotate in the base 22 to direct its lens in the direction of the driver. To accomplish this movement, the cabin module 20 may include a wrist-based pendant 52 having a pendant transmitter 54 (FIG. 7) that continuously emits a positional signal that can be received by the cabin receiver 44 in operative communication with the cabin processor 26 and cabin camera 28. The pendant 52 may also be referred to as a "follow tag" in that it enables the cabin camera 28 (also referred to as a "follow camera") to follow it. The pendant transmitter 54 may be energized by a battery 51. Executing respective programming, the cabin processor 26 can determine the directional position of the pendant signals and actuate respective motors to adjust the position of the base 22 and cabin camera 28. So long as the driver is wearing the pendant 52, such as on a wristband 50, the cabin camera 28 (or at least one of a plurality of cabin cameras) will record the activities proximate the vehicle. In addition, the wrist-based pendant 52 may include a wristband 50 and may include an auxiliary microphone and an auxiliary camera (not shown) to capture activity if the driver must step outside of the vehicle.

In another aspect, the remote monitoring module 60 is remote and displaced from the cabin monitoring assembly. For instance, the remote monitoring module 60 may be operated in a cloud based network arrangement in which one or preferably many security professionals are able to monitor the vehicle security of its subscribers. In other words, hundreds or even thousands of drivers may choose to subscribe to a system known as "Global Justice" in order to allow the security professionals to view in real time the security status of their vehicle during a traffic stop or other potentially dangerous event.

The remote monitoring module 60 includes a remote processor 62, a remote receiver 66, a remote transmitter 64, and a remote display 68. The remote receiver 66, under control of the remote processor 62, is configured to receive the collected data transmitted by the cabin transmitter 42 described above. The remote processor 62 is configured to cause the received data to be "published" or displayed by the remote display 68. In other words, the streaming video data, audio data, corresponding GPS data indicating the location of the vehicle in question, and the carbon monoxide status may be shown on a video screen being viewed by the one or more security personnel. Viewing this information in real time enables the security personnel to take steps to prevent or stop any misdeeds being committed, to initiate rescue operations, or even to control operational components of the vehicle itself.

Figure 11:
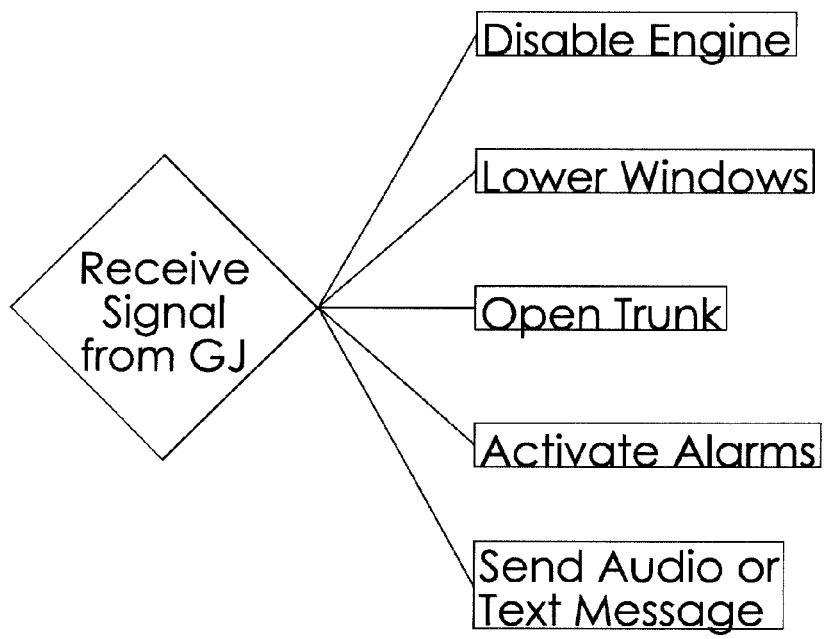
FIG. 11 is a flowchart illustrating the logic performed by the remote monitoring module according to the present invention.

More particularly, the remote processor 62 is configured to transmit specific security action instructions via the remote transmitter 64. Correspondingly, the cabin receiver 44 is configured to receive the transmitted security action instructions. Then, the cabin processor 26, executing programming steps that interpret the instructions, is configured to execute the received instructions. The security action instructions may include, but are not limited to, instructions to emit an audio message through a cabin speaker 30 (in data communication with the cabin processor 26 and situated on the base 22), instructions to actuate the engine-kill circuit 38 so as to disable the engine, instructions to the vehicle computer to lower the vehicle windows (such as to dissipate a dangerous level of carbon monoxide), signals to activate audio or visual alarms 40 (that are electrically connected to the cabin processor 26), instructions to transmit an audible or text message to predetermined contacts 69a, and instructions to the trunk module 70 as will be described further below. The action of sending these instructions is illustrated in FIG. 11. It is understood that audible messages to be emitted through the cabin speaker 30 may be words of admonition of an officer, words of advice regarding behavior of the driver, or in answer to questions asked by the driver having been collected by the cabin microphone 32 and transmitted to the remote monitoring module 60 as described above.

In another aspect, the vehicle security system 10 includes a trunk module 70 that may be situated in the trunk area of a vehicle and in data communication with the cabin processor 26, either by wires or wirelessly. The trunk module 70 may include a trunk camera 72 configured to collect video data from the trunk area, a trunk microphone 74 configured to collect audio data from the trunk area, a light 78 configured to illuminate the trunk area 14 when energized, and a trunk carbon dioxide sensor 76 configured to determine a level of carbon dioxide ($CO_2$) in the ambient air of the trunk area. It is understood that detecting a rise in $CO_2$ levels is indicative that a live person has been placed in the trunk and, as a result, the monitoring module 60 needs to be notified and activated. Since the trunk module 70 is in data communication with the cabin module 20, the data collected from the trunk module 70 components may be transmitted by the cabin transmitter 42 to the remote monitoring module 60 in the manner described previously. In this manner, the security personnel at the remote monitoring module 60 are made aware if a person has been placed in the trunk area. In an embodiment, the trunk module 70 may also include a carbon monoxide sensor (not shown). In addition, the trunk module 70 includes a trunk speaker 80 through which the security personnel can communicate audibly with the trunk module and a person in the trunk area. The components of the trunk module 70 may be energized by a battery 71.

Figure 4A:
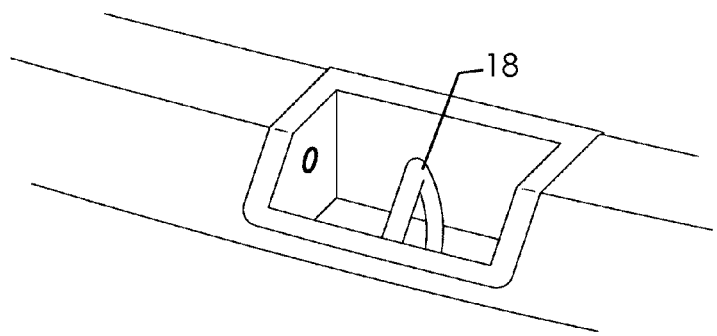
FIG. 4a is an isolated perspective view of a trunk lid locking assembly of the trunk module illustrated in a retracted configuration.
Figure 4B:
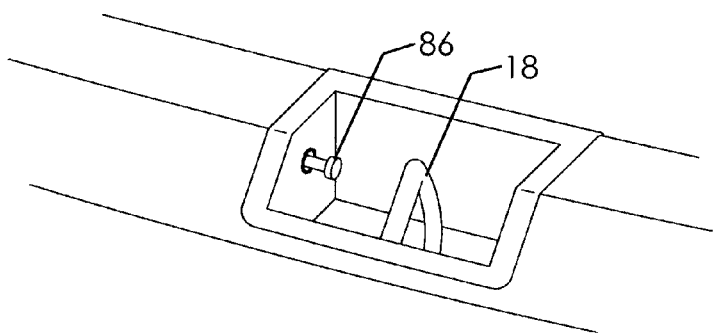
FIG. 4b is an isolated view of the trunk lid locking assembly as in FIG. 4a, illustrated in a deployed configuration.
Figure 4C:
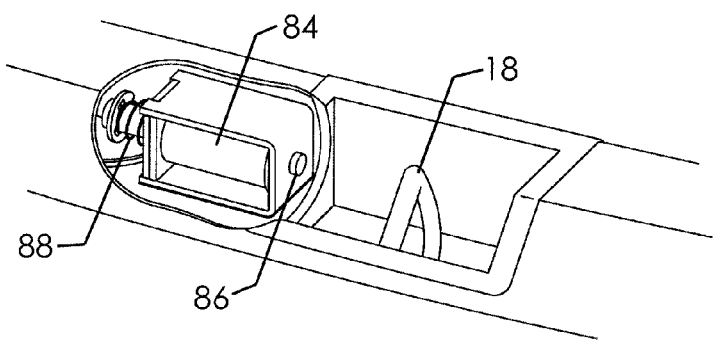
Figure 4D:
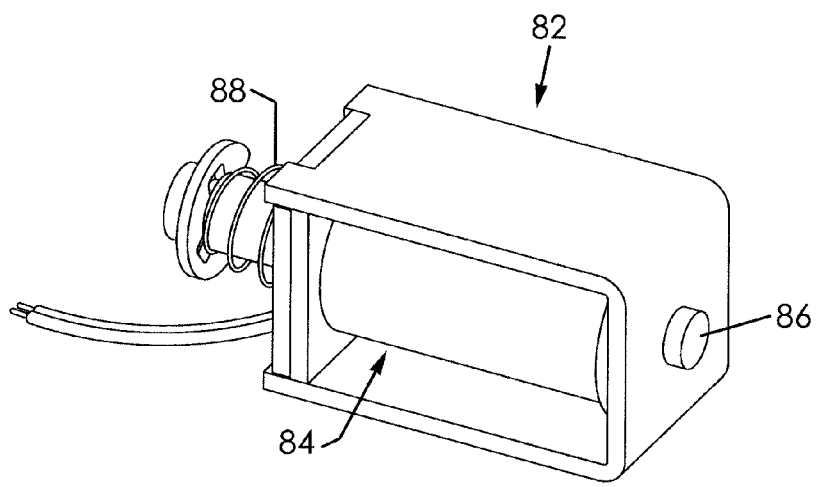
FIG. 4d is an isolated view on an enlarged scale of the trunk lid locking assembly removed from a trunk lid latching structure illustrated in the retracted configuration.
Figure 4E:
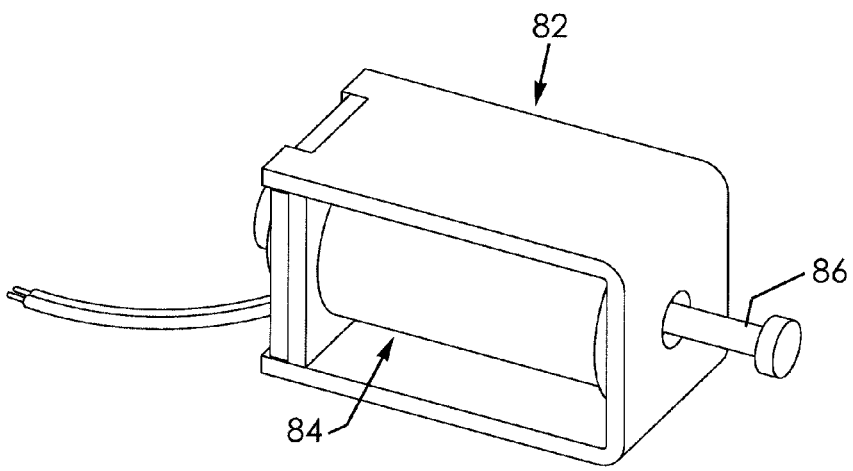
FIG. 4e is an isolated view on an enlarged scale of the trunk lid locking assembly removed from a trunk lid latching structure illustrated in the deployed configuration.

Further, the trunk module 70 may include a trunk lid locking assembly 82 that is configured to selectively allow or prevent the trunk lid 16 from closing or staying closed. With this assembly, the perpetrator of a carjacking would be unable to lock a driver in the trunk and drive away. Either the trunk lid locking assembly 82 would be activated by the driver or by the remote monitoring module 60 and would result in the trunk lid 16 being opened or, if already opened, from being closed. Specifically, the trunk lid locking assembly 82 includes a solenoid 84 mounted in a trunk wall of the vehicle adjacent the vehicle's trunk lid latch 18. The solenoid 84 includes a pin 86 that is movable by a compression spring 88 between a retracted configuration (FIGS. 4a, 4c, and 4d) and a deployed configuration (FIGS. 4b and 4e). The trunk lid 16 is permitted to engage the trunk latch 18 when the pin 86 is retracted but not when it is deployed.

A method for monitoring the security inside and proximate the interior cabin and trunk of a vehicle is disclosed herein with reference the structures and functions described above. In use, the real time vehicle security system 10 can be implemented for monitoring the security inside and proximate a vehicle. The cabin monitoring assembly and, more particularly, the cabin module 20 may be mounted inside the cabin of a vehicle. When the driver of the vehicle is being pulled over by a police officer or otherwise being approached by the police or a stranger, the cabin module 20 may be energized, such as with an on/off button 46 or using voice recognition technology. Activation causes the cabin camera 28, cabin microphone 32, cabin carbon monoxide sensor 34, GPS module 36, and other sensors to begin collecting data and transmitting the collected data using the cabin transmitter 42. The trunk monitoring module 60 may also provide important data to be sent to the remote monitoring module 60 as described above.

The transmitted data is received by the remote monitoring module 60 and viewed on the display 68. It is understood that the remote monitoring module 60 may be cloud based and accessible by appropriate personnel at different locations via the internet or other network. Viewing data from the cabin module 20 and trunk module 70, the security personnel can decide the most effective means for becoming involved, if at all, in the situation and may prompt appropriate security actions to be sent back to the respective cabin module 20—whether to control respective vehicle components, to actuate an audible message to the driver or even the officer effecting the traffic stop. Of course, the security personnel may contact local law enforcement 69b or other third parties if needed.

Figure 10:
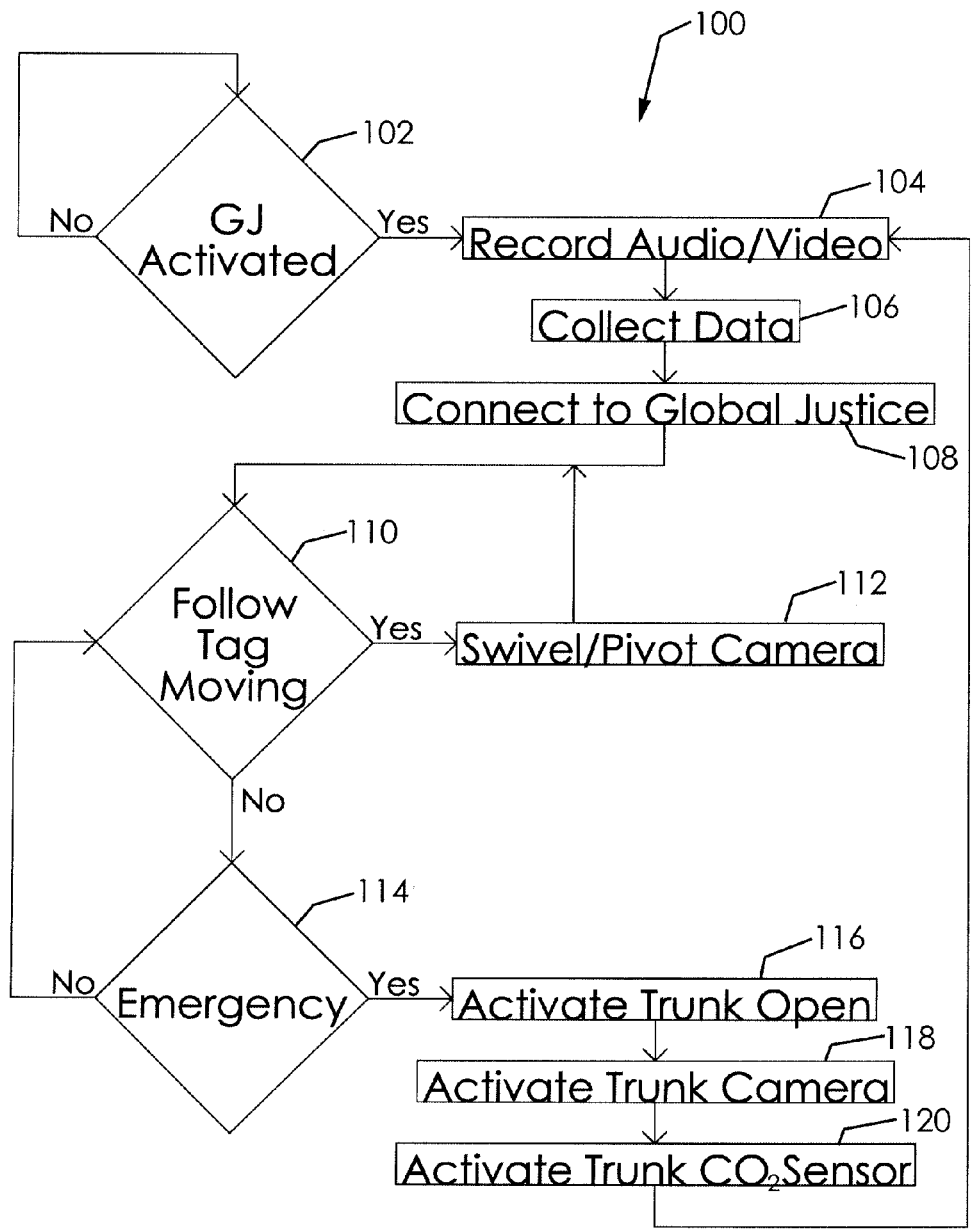
FIG. 10 is a flowchart illustrating the logic performed by the cabin module processor according to the present invention.

Now with specific reference to a process 100 for monitoring the security inside and surrounding a vehicle will be described with reference to FIG. 10. At step 102, the processor 26 determines if the cabin module 20 has been activated and, if so, the process 100 continues to step 104. Otherwise, the process 100 loops back to step 102. At step 104, the processor 26 calls for the collection of audio and video data as described previously. Then, the process 100 continues to step 106 where additional data is collected under program control, such as GPS data and carbon monoxide data. The process 100 proceeds to step 108 where the collected data is transmitted to the remote monitoring apparatus 60. The process 100 proceeds to step 110.

At step 110, the processor 26 determines if the pendant 52 is moving and, if so, the process 110 proceeds to step 112; otherwise, the process proceeds to step 114. At step 112, the processor 26 causes the base 22 to rotate in relation to signals received from the pendant 52. The process 100 then proceeds to step 110 to determine again if the pendant is still moving.

At step 114, the processor 26 determines if an emergency condition exists, such as that the driver has initiated operation of the trunk module 70. The process 100 then proceeds to steps 116 to 120 in which the trunk is opened (step 116), the trunk camera 72 is energized (step 118), and the trunk carbon dioxide sensor 76 is activated (step 120). The process 100 may then return control to step 104 to continue recording video and audio data.

It is understood that while certain forms of this invention have been illustrated and described, it is not limited thereto except insofar as such limitations are included in the following claims and allowable functional equivalents thereof.

The invention claimed is:

1. A real time vehicle security system for monitoring the security inside and proximate a vehicle having a vehicle cabin, a vehicle computer, a trunk, and a trunk lid, comprising:
  a cabin monitoring assembly, comprising:
    a cabin memory configured to store data and programming;
    a cabin processor in data communication with said cabin memory;
    a cabin module positioned inside the vehicle cabin and in data communication with said cabin processor, said cabin module including a cabin camera configured to selectively record video in the cabin of the vehicle and a cabin microphone configured to selectively record audio in the cabin of the vehicle;
    a global positioning system ("GPS") in data communication with said cabin processor and configured to generate real time global position data;
    a cabin transmitter in data communication with said cabin processor;
    programming in said memory that, when executed by said processor, causes said cabin processor to collect real time GPS data, real time video data recorded by said cabin camera, and real time audio data collected from said cabin microphone;
    programming in said memory that, when executed by said processor, causes said cabin processor to transmit said collected GPS, video, and audio data via said cabin transmitter;
  a remote monitoring module having a remote processor, a remote receiver, a remote transmitter, and a remote display;
  wherein said remote receiver is in data communication with said remote processor and configured to receive said collected data transmitted by said cabin transmitter;
  wherein said remote processor is configured to display said received data on said display;
  wherein:
    said remote processor is configured to transmit security action instructions via said remote transmitter;
    said cabin receiver is configured to receive said transmitted security action instructions;
    said cabin processor is configured to execute said security action instructions when received by said cabin receiver;
  a trunk module displaced from said cabin module and positioned in the vehicle trunk in data communication with said cabin processor, said trunk module having a trunk camera and configured to collect and deliver trunk video data to said cabin processor such that said trunk video data is transmitted to said remote receiver of said remote monitoring module;
  wherein:
    said trunk module includes a trunk microphone configured to collect trunk audio data and includes a trunk carbon dioxide sensor configured to collect trunk carbon dioxide data;
    said trunk module is configured to deliver said collected trunk audio data and said trunk carbon dioxide data to said cabin processor for transmission to said remote receiver via said cabin transmitter.

2. The real time vehicle security system as in claim 1, wherein:
  said cabin module includes a cabin carbon monoxide sensor in data communication with said cabin processor configured to collect a real time carbon monoxide level; and
  programming in said memory that, when executed by said processor, causes said cabin processor to transmit said collected cabin carbon monoxide data via said cabin transmitter.

3. The real time vehicle security system as in claim 1, wherein said cabin module includes and a cabin speaker in data communication with said cabin processor configured to selectively emit sound data received in said security action instruction from said remote monitoring module.

4. The real time vehicle security system as in claim 1, wherein:
  said cabin processor is in data communication with the vehicle computer;
  said cabin module includes a circuit that, in conjunction with the vehicle computer, causes a vehicle motor to be deactivated;
  said security action instructions include an instruction that, when communicated to the cabin module, deactivates the vehicle engine.

5. The real time vehicle security system as in claim 1, wherein said cabin module includes an alarm in data communication with said cabin processor configured to emit audio or visual alerts when actuated by a respective security action instruction received by said cabin receiver.

6. The real time vehicle security system as in claim 1, wherein said cabin module includes:
  a proximity sensor positioned outside the vehicle and in data communication with said cabin processor, said proximity sensor configured to collect motion data;
  an exterior speaker positioned outside the vehicle and configured to emit audio data when actuated by a respective security action instruction received by said cabin receiver.

7. The real time vehicle security system as in claim 1, wherein:
  said cabin camera is rotatably mounted to a base of said cabin monitoring module and configured to move rotationally either manually or automatically;
  a pendant displaced from said base of said cabin monitoring module and having a pendant transmitter configured to transmit pendant signals indicative of its position relative to said base;
  wherein said receiver of said cabin module is configured to receive said pendant position signals;
  programming in said memory that, when executed by said processor, causes said cabin processor to actuate said cabin camera to rotate relative to said base to direct said cabin camera toward said pendant.

8. The real time vehicle security system as in claim 1, wherein:
said trunk module includes a trunk speaker;
said speaker configured to emit audio data upon receipt of corresponding security action instructions.

9. The real time vehicle security system as in claim 1, wherein said trunk module includes a trunk lid blocking assembly positioned in the vehicle trunk and configured to selectively block the trunk lid from closing, said trunk lid blocking assembly includes a solenoid is mounted adjacent a vehicle trunk lid latch and is selectively moved between a retracted configuration that allows the trunk lid to engage the trunk lid latch and a deployed configuration that prevents the trunk lid from engaging the trunk lid latch.

10. The real time vehicle security system as in claim 1, wherein said security action instructions are taken from a group that includes disable engine, lower windows, open trunk, activate alarms, and send audio or text message.

11. A method for real time monitoring the security inside and proximate a vehicle having a vehicle computer, a trunk, and a trunk lid, comprising:
recording video via a cabin module having a cabin camera positioned in the cabin of the vehicle;
recording audio via a microphone of said cabin module positioned in the cabin of the vehicle;
collecting GPS data via a GPS device of said cabin module positioned in the cabin of the vehicle, said collected GPS data corresponding in real time to said collected video data and said audio data;
transmitting via a cabin transmitter of said cabin module said collected video, audio, and GPS data in real time;
receiving said transmitted video, audio, and GPS data by a remote monitoring module having a remote processor, a remote receiver, a remote transmitter, and a remote display;
publishing said collected video, audio, and GPS data on a display in data communication with said remote processor;
transmitting via said remote transmitter a plurality of security action instructions;
receiving via said cabin receiver said plurality of security action instructions;
said cabin processor executing said plurality of security action instructions when received by said cabin receiver;
collecting and delivering trunk data via a trunk module displaced from said cabin module and positioned in the vehicle trunk in data communication with said cabin processor, said trunk module having a trunk camera configured to collect and deliver trunk video data to said cabin processor; and
transmitting said collected trunk video data to said remote receiver of said remote monitoring module;
collecting trunk audio data with a trunk microphone of said trunk module;
collecting trunk carbon dioxide data with a trunk carbon dioxide sensor of said trunk module; and
delivering said collected trunk audio data and said trunk carbon dioxide data to said cabin processor for transmission to said remote receiver via said cabin transmitter.

12. The method as in claim 11, further comprising emitting sound data through a cabin speaker of said cabin module includes a cabin speaker according to respective security action instructions received from said remote monitoring module.

13. The method as in claim 11, wherein:
said cabin processor is in data communication with the vehicle computer;
said cabin module includes a circuit that, in conjunction with the vehicle computer, causes a vehicle motor to be deactivated; and
said real time vehicle security system further comprising deactivating the vehicle engine upon said cabin processor receiving a respective security action instruction.

14. The method as in claim 11, wherein said cabin module includes an alarm in data communication with said cabin processor configured to emit audio or visual alerts when actuated by a respective security action instruction received by said cabin receiver.

15. The method as in claim 11, wherein said cabin module includes:
a proximity sensor positioned outside the vehicle and in data communication with said cabin processor, said proximity sensor configured to collect motion data;
an exterior speaker positioned outside the vehicle and configured to emit audio data when actuated by a respective security action instruction received by said cabin receiver.

16. The method as in claim 11, wherein:
said cabin camera is rotatably mounted to a base of said cabin monitoring module and configured to move rotationally either manually or automatically;
a pendant displaced from said base of said cabin monitoring module and having a pendant transmitter configured to transmit pendant signals indicative of its position relative to said base;
said real time vehicle security system further comprising:
receiving via said receiver of said cabin module said pendant position signals; and
actuating said cabin camera to rotate relative to said base to direct said cabin camera toward said pendant.

17. The method as in claim 11, further comprising emitting audio data through a trunk speaker of said trunk module according to respective security action instructions received by said cabin processor.

18. A method for real time monitoring the security inside and proximate a vehicle having a vehicle computer, a trunk, and a trunk lid, comprising:
recording video via a cabin module having a cabin camera positioned in the cabin of the vehicle;
recording audio via a microphone of said cabin module positioned in the cabin of the vehicle;
collecting GPS data via a GPS device of said cabin module positioned in the cabin of the vehicle, said collected GPS data corresponding in real time to said collected video data and said audio data;
transmitting via a cabin transmitter of said cabin module said collected video, audio, and GPS data in real time;
receiving said transmitted video, audio, and GPS data by a remote monitoring module having a remote processor, a remote receiver, a remote transmitter, and a remote display;
publishing said collected video, audio, and GPS data on a display in data communication with said remote processor;
transmitting via said remote transmitter a plurality of security action instructions;
receiving via said cabin receiver said plurality of security action instructions;
said cabin processor executing said plurality of security action instructions when received by said cabin receiver;
collecting and delivering trunk data via a trunk module displaced from said cabin module and positioned in the vehicle trunk in data communication with said cabin processor, said trunk module having a trunk camera configured to collect and deliver trunk video data to said cabin processor; and transmitting said collected trunk video data to said remote receiver of said remote monitoring module;

emitting audio data through a trunk speaker of said trunk module according to respective security action instructions received by said cabin processor; and blocking the trunk lid from closing with a trunk lid blocking assembly positioned in the vehicle trunk, said trunk lid blocking assembly including a solenoid mounted adjacent a vehicle trunk lid latch and that is selectively moved between a retracted configuration that allows the trunk lid to engage the trunk lid latch and a deployed configuration that prevents the trunk lid from engaging the trunk lid latch.

19. A real time vehicle security system for monitoring the security inside and proximate a vehicle having a vehicle computer, a trunk, and a trunk lid, comprising:

a cabin monitoring assembly, comprising:
- a cabin memory configured to store data and programming;
- a cabin processor in data communication with said cabin memory;
- a cabin module positioned inside a cabin of a vehicle and in data communication with said cabin processor, said cabin module including a cabin camera configured to selectively record video in the cabin of the vehicle and a cabin microphone configured to selectively record audio in the cabin of the vehicle;
- a global positioning system ("GPS") in data communication with said cabin processor and configured to generate real time global position data;
- a cabin transmitter in data communication with said cabin processor;
- programming in said memory that, when executed by said processor, causes said cabin processor to collect real time GPS data, real time video data recorded by said cabin camera, and real time audio data collected from said cabin microphone;
- programming in said memory that, when executed by said processor, causes said cabin processor to transmit said collected GPS, video, and audio data via said cabin transmitter;

a remote monitoring module having a remote processor, a remote receiver, a remote transmitter, and a remote display;

wherein:
- said remote receiver is in data communication with said remote processor and configured to receive said collected data transmitted by said cabin transmitter;
- said remote processor is configured to display said received data on said display;
- remote processor is configured to transmit security action instructions via said remote transmitter;
- said cabin receiver is configured to receive said transmitted security action instructions;
- said cabin processor is configured to execute said security action instructions when received by said cabin receiver;

wherein said cabin module includes a cabin speaker in data communication with said cabin processor and configured to selectively emit a voice message received in said security action instruction from said remote monitoring module;

wherein said cabin module includes:
- a proximity sensor positioned outside the vehicle and in data communication with said cabin processor, said proximity sensor configured to collect motion data;
- an exterior speaker positioned outside the vehicle and in data communication with said cabin processor, said cabin processor being configured, upon receiving data indicative of motion detected by said proximity sensor, to automatically actuate said exterior speaker to emit a voice message indicative of security monitoring.

20. The real time vehicle security system as in claim 19, wherein:

said cabin camera is rotatably mounted to a base of said cabin monitoring module and configured to move rotationally either manually or automatically;

a pendant separated from said base of said cabin monitoring module and having a pendant transmitter configured to transmit pendant signals indicative of its position relative to said base;

wherein said receiver of said cabin module is configured to receive said pendant position signals;

programming in said memory that, when executed by said processor, causes said cabin processor to actuate said cabin camera to rotate relative to said base to direct said cabin camera toward said pendant.

\* \* \* \* \*